(12) United States Patent
Lindqvist et al.

(10) Patent No.: US 6,363,086 B1
(45) Date of Patent: Mar. 26, 2002

(54) METHOD FOR COMBINING SIGNALS ON A DIGITAL INTERFACE

(75) Inventors: Dan Lindqvist, Sollentuna; Jacob Österling, Järfälla, both of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/205,340

(22) Filed: Dec. 3, 1998

(51) Int. Cl.$^7$ ................................................ H04J 13/02
(52) U.S. Cl. ...................... 370/527; 370/529; 370/546
(58) Field of Search ............................... 370/204, 215, 370/343, 480, 527, 529, 546; 375/361, 239, 241

(56) References Cited

U.S. PATENT DOCUMENTS

| | | | | |
|---|---|---|---|---|
| 5,239,672 A | * | 8/1993 | Kurby et al. | 455/16 |
| 5,504,751 A | * | 4/1996 | Ledzius et al. | 375/355 |
| 5,982,837 A | * | 11/1999 | Earnest | 375/377 |
| 6,172,994 B1 | * | 1/2001 | Schaffner et al. | 370/529 |

FOREIGN PATENT DOCUMENTS

| | | |
|---|---|---|
| EP | 0 174 124 | 3/1986 |
| EP | 0 211 438 | 2/1987 |
| EP | 0 369 690 | 5/1990 |
| EP | 0 392 653 | 10/1990 |
| EP | 3 565 305 | 10/1993 |
| FR | 2 475 326 | 8/1981 |

OTHER PUBLICATIONS

EPO Standard Search Report, mailed Aug. 17, 1999.

* cited by examiner

*Primary Examiner*—Ricky Ngo
(74) *Attorney, Agent, or Firm*—Jenkens & Gilchrist, P.C.

(57) ABSTRACT

A method for combining signals being conveyed across a digital interface is disclosed. In one embodiment, a subharmonic of a frequency is superimposed on asynchronous data. The subharmonic can be used to carry a frequency reference across the digital interface. In another embodiment, a time stamp algorithm is used to carry a time reference from a master circuit to a slave circuit across a digital interface. The transmission delay between the master circuit and slave circuit is measured. The master circuit transmits time correction messages to the slave circuit, based on the time the correction message is transmitted plus the transmission delay. In another embodiment, a reset signal is carried across a digital interface by discontinuing the transfer of a frequency reference for a predetermined time. A lowpass filter can be used at the receiving side of the interface to recognize the absence of the frequency reference and initiate a reset procedure at that side.

16 Claims, 3 Drawing Sheets

METHOD FOR COMBINING SIGNALS ON A DIGITAL INTERFACE

BACKGROUND OF THE INVENTION

1. Technical Field of the Invention

The present invention relates generally to the telecommunications field and, in particular, to a method for combining signals on a digital interface between units.

2. Description of Related Art

In digital cellular communication systems, such as, for example, the Global System for Mobile Communications (GSM), distributed Radio Base Stations (RBSs) can be configured with Common Function (CF) and base band digital signal processing (BB DSP) components in one unit, and radio transmitter/receiver components in one or more separate radio units. Essentially, the radio units are location-dependent, because their coverage is determined by their respective antenna's location and direction. On the other hand, the CF/BB DSP units are location-independent, and a single CF/BB DSP "pool" unit can serve many different radio units, and thereby many cells. Typically, such radio units are multi-carrier radios.

Alternatively, a transceiver-oriented RBS configuration can be used, which has one CF unit and a plurality of separate transceivers (TRXs). In both of these RBS configurations, the CF part of the respective unit is responsible for switching between the transport network (e.g., Abis) and the TRXs or radio units. Also, the CF unit contains a Reference Oscillator, which is frequency-locked to the transport network (or another reference), and a Reference Clock which states the time. The carrier frequencies used by the RF components in the TRXs or radio units are derived from the Reference Oscillator, and the start times for the transmissions and receptions are based on the Reference Clock's time.

In any event, a digital interface is required to interconnect the CF/BB DSP unit with the radio units ("pool" system), or the CF unit with the TRXs (transceiver-oriented system). Typically, such a digital interface has to convey four independent pieces of information: asynchronous data; frequency reference information; absolute time information; and reset information.

Essentially, the asynchronous data is control information about the burst and actual data to be transmitted, which the BB DSP unit conveys to the other units. The frequency reference information can be generated, for example, by filtering out the frequency of the transmission interface signal. However, since the frequency reference is used to generate the radio units, or TRXs' RF carrier, the accuracy requirements imposed on the frequency reference are very stringent. For example, the GSM Technical Specification states that no carrier may deviate more than 50 ppb from the Reference Oscillator frequency. The absolute time information is used to ensure that the radio transmission and BB DSP components have the same perception of time. Notably, in an RBS having multiple radio units, it is essential that the different radio units have the same perception of time. As such, the GSM Technical Specification states that the timing difference between any two transceivers/radio units must not be greater than 915 ns. Finally, the reset information being conveyed is also important, because it is essential to be able to "reset" the radio components if, for example, their software should lock-up for any reason.

A significant problem associated with the design of a digital interface between the CF/BB DSP unit and radio unit (or CF unit and TRXs) in a cellular RBS is how to minimize the number of wires (or optical conductors) between the units. There are a number of reasons why it is important to keep the number of interface wires (or optical conductors) to a minimum. For example, the electrical or optical connectors used at the units take up a significant amount of space. Also, the number of pin connections to/from integrated circuits (e.g., ASICs) at the inputs/outputs of the units are limited in number. Furthermore, for relatively long distances (e.g., a wire or fiber optic conductor between units can be hundreds of meters long), the cost of the transmission media can be quite high (especially for optic fibers). An advantage of reducing the number of conductors in a digital interface is that this reduction is typically accompanied by reduced power consumption in the RBS involved. Yet another advantage of keeping the number of conductors in a digital interface to a minimum is that the costs of the modems and transceivers involved are reduced.

Under normal operating conditions, separate interfaces are used to convey the asynchronous data, frequency reference, timing, and reset information. As such, a basic problem with imposing a design requirement that the digital interface between RBS units is to carry as few signals as possible is that, for the existing systems, the digital interface has to carry the frequency reference and time reference signals, in addition to the asynchronous data. Notably, as mentioned above, these reference signals have extremely stringent accuracy or resolution requirements imposed. Furthermore, there are no existing asynchronous digital interfaces that carry a frequency reference signal.

As mentioned above, the time reference is used by the RBS's signal processing component to transmit bursts at the correct instant of time. In fact, for mobile positioning applications (i.e., determining the position of mobile terminals in a cellular network), the accuracy requirement imposed on the timing reference can be extremely stringent (<100 ns variation).

The reset signal conveyed over the digital interface should be designed so that it can be received and interpreted by a simple analog circuit, which in turn, can output a signal to reset the RBS's components as required (e.g., after a software lockup). In other words, if an Application Specific Integrated Circuit (ASIC) or other circuit is used primarily for re-initiating RBS unit operations after a software lockup, the simple analog circuit's operation to reset the ASIC should be independent of the ASIC's (or other circuit's) operation. As such, the existing RBSs do not provide such a capability without additional conductors. However, as described in detail below, the present invention successfully resolves the above-described problems.

SUMMARY OF THE INVENTION

In accordance with the present invention, a method for combining signals being conveyed across a digital interface is provided. In one embodiment of the present invention, asynchronous data are superimposed on a subharmonic of a frequency. The subharmonic can be used to carry a frequency reference across the digital interface. The frequency reference can be used, for example, to generate a carrier frequency in a radio or transceiver unit. In a second embodiment of the present invention, a time stamp algorithm is used to carry a time reference from a master circuit to a slave circuit across a digital interface. The transmission delay between the master circuit and slave circuit is measured. The master circuit transmits time correction messages to the slave circuit, based on the time the correction message is transmitted plus the transmission delay. In a third embodiment of the present invention, a reset signal for resetting a radio transceiver unit is carried across a digital interface by omitting the transfer of the frequency reference from the first embodiment for a predetermined time. A lowpass filter or watchdog circuit can be used at the receiving side of the interface to recognize the absence of the frequency reference and, in turn, initiate a reset procedure at the receiving side.

An important technical advantage of the present invention is that the number of conductors in a digital interface can be minimized.

Another important technical advantage of the present invention is that by minimizing the number of conductors used in a digital interface, the power consumption of the equipment in use is minimized.

Yet another important technical advantage of the present invention is that by minimizing the number of conductors used in a digital interface, the cost of the equipment in use is minimized.

Still another important technical advantage of the present invention is that by minimizing the number of conductors used in a digital interface, the space requirements for the equipment in use are minimized.

Still another important technical advantage of the present invention is that by minimizing the number of conductors used in a digital interface, the number of integrated circuit pins required for the equipment in use is minimized.

Still another important technical advantage of the present invention is that a digital interface can be used to provide simpler integrated circuit implementation, carry asynchronous data and a frequency reference simultaneously on one conductor, convey a highly accurate time reference using one conductor, convey a modulation signal that is DC-free, and convey reset information, asynchronous data, and a frequency reference concurrently on one conductor.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–7 of the drawings, like numerals being used for like and corresponding parts of the various drawings.

Essentially, in accordance with the present invention, a method for combining signals being conveyed across a digital interface is provided. In one embodiment of the present invention, asynchronous data are superimposed on a subharmonic of a frequency. The subharmonic can be used to carry a frequency reference across the digital interface. The frequency reference can be used, for example, to generate a carrier frequency in a radio or transceiver unit. In a second embodiment of the present invention, a time stamp algorithm is used to carry a time reference from a master circuit to a slave circuit across a digital interface. The transmission delay between the master circuit and slave circuit is measured. The master circuit transmits time correction messages to the slave circuit, based on the time the correction message is transmitted plus the transmission delay. In a third embodiment of the present invention, a reset signal that can be used for resetting a radio transceiver unit is carried across a digital interface by omitting the transfer of the frequency reference from the first embodiment for a predetermined time. A lowpass filter or watchdog circuit can be used at the receiving side of the interface to recognize the absence of the frequency reference and, in turn, initiate a reset procedure at the receiving side.

Figure 1:
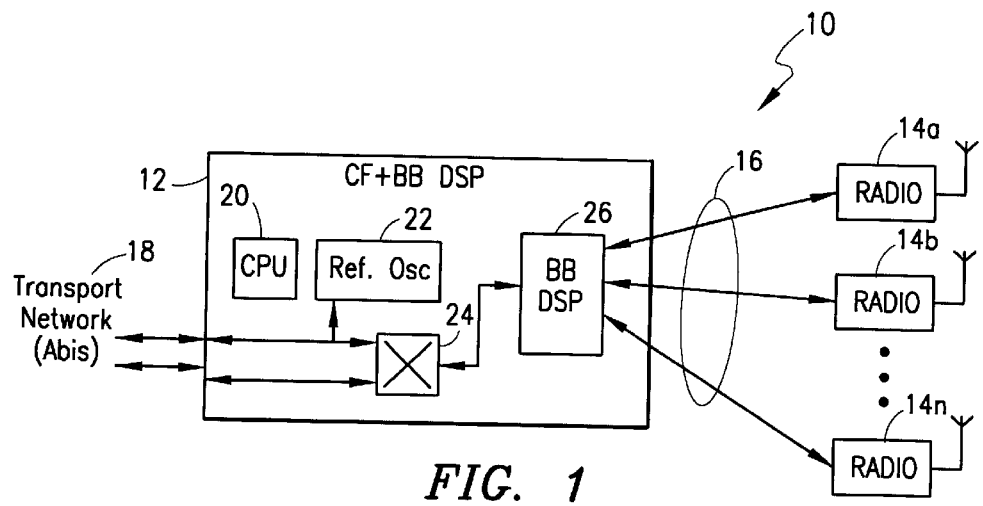
FIG. 1 is a block diagram that illustrates a BB DSP pool type of RBS, which can be used to implement a preferred embodiment of the present invention.

Specifically, FIG. 1 is a block diagram that illustrates a BB DSP pool type of RBS, which can be used to implement a preferred embodiment of the present invention. The exemplary RBS 10 shown can be implemented in a digital cellular communication system, such as, for example, in a GSM network. However, the invention is not intended to be limited to any particular type of cellular communication system, but can cover a digital interface between units in any system, especially where there is an advantage in reducing the number of interface conductors used.

Referring to FIG. 1, RBS 10 includes a CF/BB DSP unit 12. Unit 12 includes a processor (CPU) 20 in the CF part for executing control and processing applications, including the function of assisting the BB DSP part 26 with deriving a frequency reference from the transport network 18, and the switching functions of switch 24. A Reference Oscillator 22 generates a frequency reference, which is to be conveyed to the RF components in the respective radio units 14a–n. The frequency reference is used to derive the RF carrier frequencies to be used. A digital interface 16 composed of a plurality of signal conductors (wire and/or fiber optic) conveys signals between the BB DSP part 26 and the respective radio units 14a–n.

Figure 2:
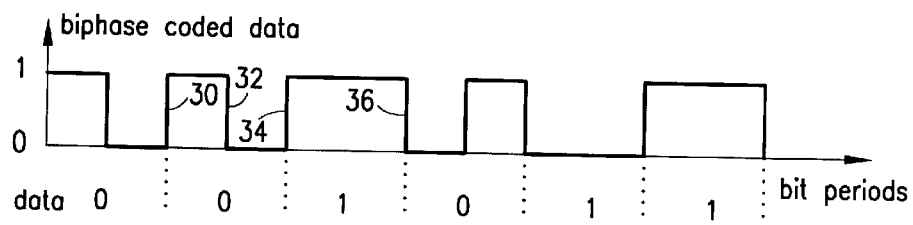
FIG. 2 is a diagram that illustrates an exemplary signal format that can be used to convey a frequency reference over a digital interface, in accordance with the preferred embodiment of the present invention.

FIG. 2 is a diagram that illustrates an exemplary signal format that can be used to convey a frequency reference over the digital interface 16, in accordance with the preferred embodiment of the present invention. First, for clarification purposes, it is useful to describe the following protocol for an electrical layer, which can be used to transfer data over the digital interface 16 shown in FIG. 1. For example, an asynchronous data message can be transferred over a conductor of the digital interface 16 using a polar bi-phase coded data signal. In other words, referring to FIG. 2, a signal value of "1" is transferred over the digital interface 16 as a fundamental frequency, $f_0$. A signal value of "0" is transferred over the interface as a multiple of the fundamental frequency, or $f_1=2*f_0$. The period of one bit ("0" or "1") being transferred is equal to $1/f_1$, and the phase of the transferred signal is always preserved.

As such, a full period for a signal value of "0" is completed over the bit period (i.e., an edge 30 of the signal occurring at the beginning of the bit period, an edge 32 occurring at the middle of the bit period, and an edge 34 occurring at the end of the bit period). A signal value of "1" completes half a period over the bit period (i.e., edge 34 occurring at the beginning of the bit period, and an edge 36 occurring at the end of the bit period).

Figure 3:
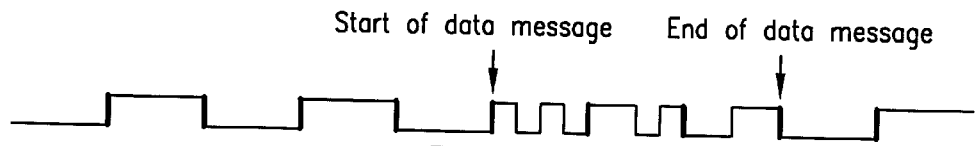
FIG. 3 is a diagram that illustrates how a frequency reference can be added to bi-phase coded data being transferred over a conductor of a digital interface, in accordance with the preferred embodiment of the present invention.
Figure 4:
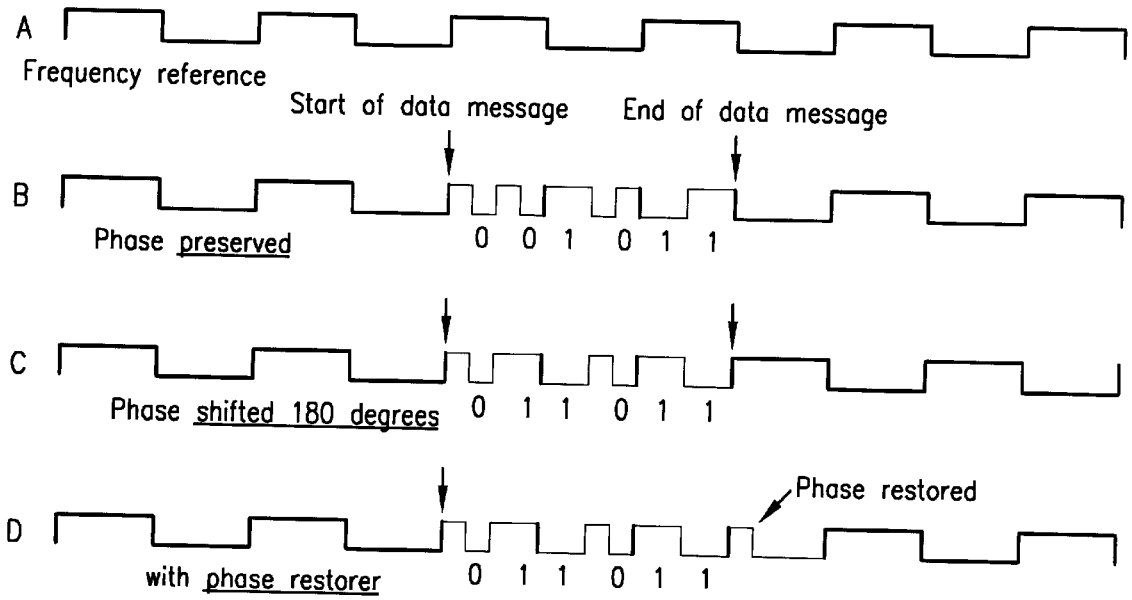
FIG. 4 is a diagram that illustrates the use of a phase restorer, in accordance with the preferred embodiment of the present invention.

FIG. 3 is a diagram that illustrates how a frequency reference can be added to bi-phase coded data being transferred over a conductor of the digital interface 16, in accordance with the preferred embodiment of the present invention. Specifically, in accordance with the present invention, a subharmonic of the fundamental frequency, $f_0$, is superimposed on an asynchronous data message. In other words, the data message has superimposed on it a subharmonic frequency, $f_2$, such that $f_2=f_0/n$, where n>1. The start of the data message is aligned to a level transition of the a subharmonic frequency, $f_2$. Based on the frequencies $f_0$, $f_1$ and $f_2$ selected, it is always possible to regenerate the subharmonic, $f_2$. Also, within the data message, there is no interference applied from the subharmonic frequency to the bi-phase coded data. As illustrated by the exemplary signal shown in FIG. 3, the subharmonic of the frequency, $f_0$, is used to carry the frequency reference (bolded level transitions). In this case, an asynchronous data message is shown with the first subharmonic (n=2) frequency superimposed. Advantageously, only one conductor is needed to convey both the asynchronous data and frequency reference over the digital interface 16.

In one aspect of the preferred embodiment, the frequency reference can be conveyed over the digital interface 16 on the data signal, by having the receiving circuit (e.g., ASIC) detect the edges of the frequency reference, $f_2$, from the data on which the frequency reference is superimposed. The receiving circuit can then generate and output a square wave representing the frequency reference, $f_2$. Alternatively, the receiving circuit can output the detected edge of the frequency reference as a "strobe" signal. Essentially, the approach used depends on the phase-locked loop (PLL) circuit used in the specific radio unit 14a–n involved.

Figure 5:
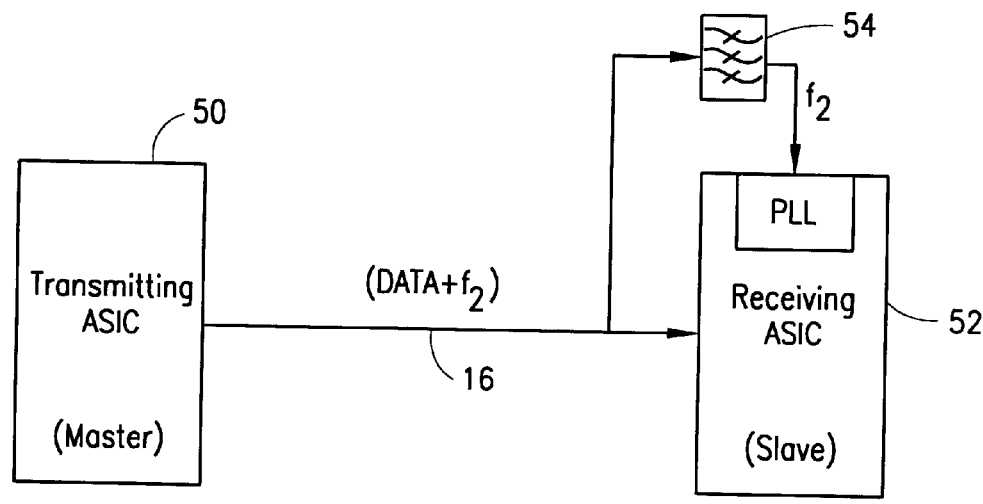
FIG. 5 is a block diagram that illustrates the use of a lowpass filter to extract a frequency reference from asynchronous data on a digital interface, in accordance with the preferred embodiment of the present invention.

In a second aspect of the preferred embodiment, a phase restorer approach is used to convey a frequency reference across the digital interface 16 along with a data message superimposed. Depending on the contents of the message, the phase of the frequency reference, $f_2$, as illustrated in the first aspect of the preferred embodiment (FIG. 3), is preserved or shifted 180 degrees when the transfer across the interface has been completed. As such, in the second aspect, the frequency reference is carried with the data message, by requiring the transmitting circuit (e.g., ASIC in the BB DSP 26) to always restore the phase at the middle of the bit period following the transferred message. The receiving circuit (e.g., ASIC in a radio unit 14a–n) interprets the phase restorer signal (as shown in FIG. 4D) as a disturbance on the transmission line. Such a transmitted "illegal" signal level transition is referred to as a code-violation symbol. However, an advantage of this phase restorer approach is that the frequency reference, $f_2$, can be readily extracted from the data message by using an analog lowpass filter 54 (as illustrated by FIG. 5). For example, the lowpass filter can be the lowpass filter used in a conventional PLL circuit.

Figure 6:
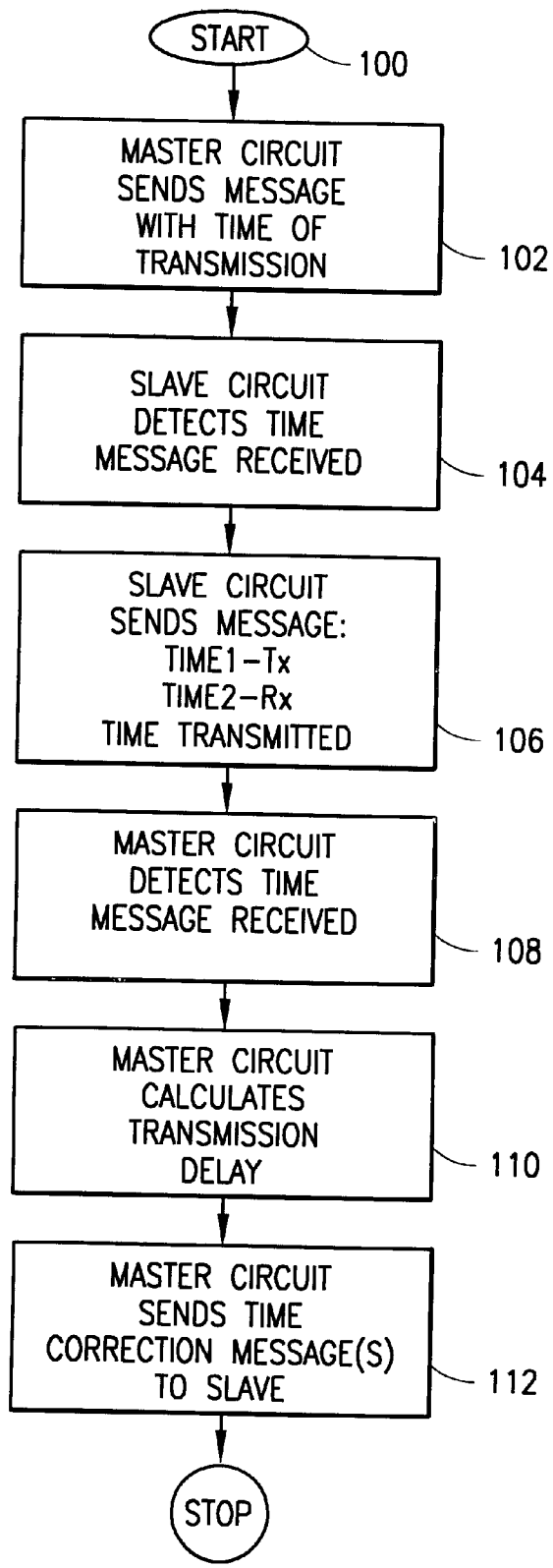
FIG. 6 is a flow diagram of a time stamp algorithm that can be used to implement the present invention.

FIG. 6 is a flow diagram of a time stamp algorithm that can be used to implement the present invention. FIG. 5 can be used to help illustrate the present invention in this regard. The absolute time can be transferred from the master circuit (e.g., ASIC in the BB DSP 26) over the digital interface 16 to a slave circuit (e.g., ASIC in a radio unit 14a–n) using this exemplary algorithm 100. First, the transmission delay between the master and slave circuits (50, 52) is measured. It can be assumed that an identical interface is used for the return data transfer. At step 102, the master circuit 50 transmits a message over the digital interface 16 containing information about the exact time the message was transmitted (e.g., the time of the edge at the beginning of the first bit period). At step 104, the slave circuit 52 determines the exact time it received the message from the master circuit 50 (e.g., the time of the edge at the beginning of the first bit period). At step 106, the slave circuit 52 transmits a message over the digital interface 16 including the following three pieces of information: the time extracted from the received message (transmitted in step 102); the time that message was retrieved (from step 104); and the exact time this message (step 106) was transmitted. At step 108, the master circuit 50 determines the exact time it received the message transmitted at step 106. At step 110, using the information received in the message, and the determined time from step 108, the master circuit 50 calculates the transmission delay (over the digital interface 16). At step 112, at an appropriate rate, the master circuit 50 transmits time correction messages to the slave circuit 52 over the digital interface 16. Such a message carries information about the absolute time when the slave circuit 52 receives a message (e.g., the time of reception of the edge at the beginning of the first bit period). The master circuit 50 calculates this absolute time, by adding the time of transmitting the edge at the beginning of the first bit period to the calculated transmission delay (from step 110). Consequently, the absolute time reference can be conveyed over the digital interface 16 along with data, without requiring an additional conductor.

As illustrated by the description above, it is important to be able to determine the exact time of the beginning of a data message, either when the message is transmitted or received. In accordance with the present invention, the start of a data message can be determined with high precision, because the start of the message occurs at the level transition of the frequency reference. In the receiving circuit (e.g., 52), the level transitions of the frequency reference can be recorded to increase the precision in determining the start of the message.

Specifically, the receiving circuit (e.g., ASIC) 52 can predict just when a time stamp is to be received. As such, all messages begin aligned with the idle symbols. Also, the level transition between the idle symbols is available inside the messages (i.e., the extracted clock signal). The receiving circuit 52 can determine the frequency difference between the transmitting circuit 50 and itself (52) by analyzing the number of samples between these level transitions. For example, if the number of samples are 17, 16, 16, 16, 16, 16, 16, 17, 16, 16, 16, 16, 16, 16, 17, 16, . . . , the receiving circuit can determine that the level transition occurs every 16+1/7 sample. If a time stamp message is received at four level transitions after a 17-symbol period, the receiving circuit 52 can time stamp the message to equal the time of the last 17-symbol period +4 * (16+1/7) sample periods (i.e., with a precision of 1/7 of a sample period instead of a whole sample period, which would be the best possible precision if no continuous "signal" was available)

In accordance with a different aspect of this embodiment, a reset signal can be conveyed over the digital interface 16 using the following approach. A reset signal can be generated by the transmitting circuit (e.g., ASIC 50) omitting a transfer of the frequency reference for a predetermined time (e.g., 10 ms). (Alternatively, a watchdog circuit may also be used to generate the reset signal.) A lowpass filter at the input to the receiving circuit (e.g., ASIC 52) can be used to generate the reset signal. As such, if a signal is present on the interface 16, then the output of the lowpass filter is equal to Vcc/2. If no signal is present on the interface 16, then the output voltage of the lowpass filter decreases to 0, and the receiving circuit (e.g., ASIC 52) is reset.

Figure 7:
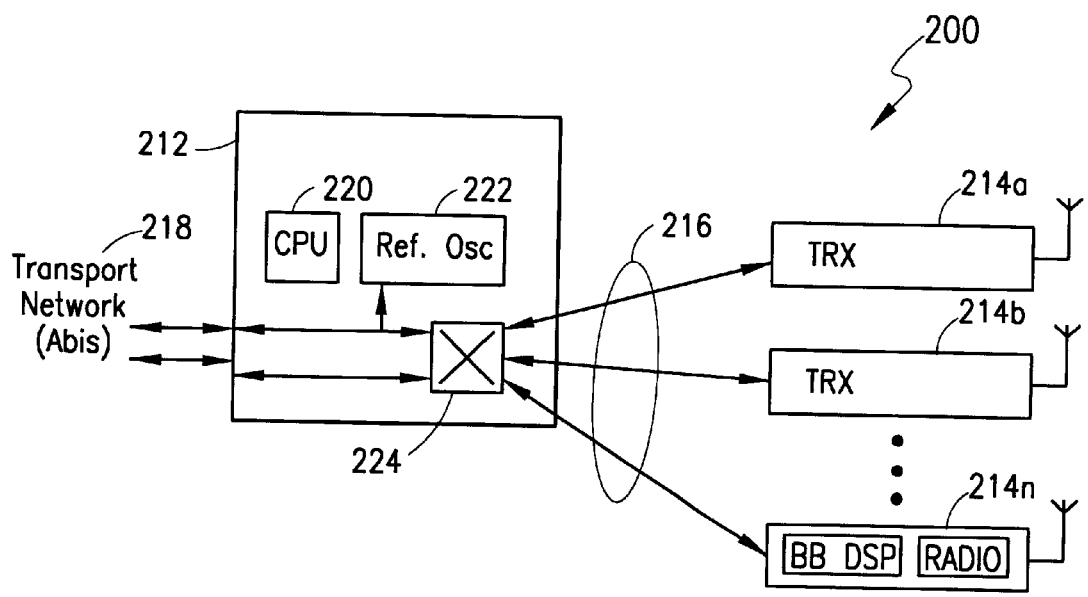
FIG. 7 is a block diagram that illustrates a transceiver-oriented RBS, which can be used to implement another embodiment of the present invention.

FIG. 7 is a block diagram that illustrates a transceiver-oriented RBS, which can be used to implement yet another embodiment of the present invention. For this exemplary embodiment, the RBS 200 shown includes a distribution switching unit 212. Unit 212 includes a processor (CPU) 220 in the CF part for executing control and processing applications, including the function of deriving a time reference from the transport network 218, and the switching functions of switch 224. A Reference Oscillator 222 generates the frequency reference, which is to be conveyed to the RF components in the respective TRXs 214a–n. The frequency reference is used to derive the RF carrier frequencies to be used. A digital interface 216 composed of a plurality of signal conductors (wire and/or fiber optic) conveys signals between the distribution switch unit 212 and the respective TRXs 214a–n. As such, the methods described above for conveying a frequency reference, time reference, and reset signal over the digital interface 16 shown in FIG. 1 can also be used for the same functions in the transceiver-oriented RBS shown in FIG. 7.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for simultaneously conveying asynchronous data and a frequency reference over a single conductor, comprising:
   a first unit connected to a first end of said single conductor, said first unit operable to bi-phase code said asynchronous data using frequencies $f_0$ and $f_1$, represent said frequency reference with a frequency $f_2$, said frequency $f_2$ a subharmonic of said frequency $f_0$, and superimpose said bi-phase coded data on said frequency $f_2$; and
   a second unit connected to a second end of said single conductor, said second unit operable to extract said frequency $f_2$ from said bi-phase coded data.

2. The system of claim 1, wherein said asynchronous data comprises absolute time information related to a transmission time of a message.

3. The system of claim 1, wherein said second unit is operable to detect an edge of said frequency $f_2$ on said bi-phase coded data.

4. The system of claim 1, wherein said second unit is operable to detect a plurality of edges of said frequency $f_2$, and generate a periodic signal representing said frequency reference.

5. The system of claim 1, wherein said second unit is operable to restore a phase of said frequency reference, and extract said frequency reference.

6. The system of claim 1, wherein said first unit is operable to restore a phase of said frequency reference by use of a code violation symbol.

7. The system of claim 1, wherein a leading edge of said asynchronous data is aligned with a level transition of said frequency reference.

8. The system of claim 1, wherein said first unit is operable to discontinue conveyance of said frequency reference for a predetermined time, and said second unit is operable to generate a reset signal responsive to an absence of said frequency reference during said predetermined time.

9. The system of claim 1, wherein said single conductor comprises an interface between units in a radio base station.

10. A method for simultaneously conveying asynchronous data and a frequency reference from a first unit to a second unit over a single conductor, comprising the steps of:
    bi-phase coding said asynchronous data using frequencies $f_0$ and $f_1$;
    representing said frequency reference with a frequency $f_2$, said frequency $f_2$ a subharmonic of said frequency $f_0$; and
    superimposing said bi-phase coded data on said frequency $f_2$.

11. The method of claim 10, wherein said asynchronous data comprises absolute time information related to a transmission time of a message.

12. The method of claim 10, further comprising the step of said second unit detecting an edge of said frequency $f_2$ on said bi-phase coded data.

13. The method of claim 12, wherein said detecting step further comprises the steps of:
    detecting a plurality of edges of said frequency $f_2$; and
    generating a periodic signal representing said frequency reference.

14. The method of claim 10, further comprising the steps of:
    restoring a phase of said frequency reference; and
    extracting said frequency reference.

15. The method of claim 10, further comprising the step of:
    restoring a phase of said frequency reference by use of a code violation symbol.

16. The method of claim 10, wherein a leading edge of said asynchronous data is aligned with a level transition of said frequency reference.

* * * * *